United States Patent [19]
Hicks

[11] Patent Number: 5,518,322
[45] Date of Patent: May 21, 1996

[54] SHOPPING CART WHEEL WITH ROLLER/BALL BEARINGS

[76] Inventor: Jimmy L. Hicks, 6801 Exchange Dr., Mansfield, Tex. 76063

[21] Appl. No.: 366,485

[22] Filed: Dec. 30, 1994

[51] Int. Cl.⁶ .............................. F16C 13/00; F16C 33/58
[52] U.S. Cl. .......................... 384/544; 384/492; 384/504; 384/516; 384/589
[58] Field of Search .................................. 384/544, 543, 384/449, 492, 490, 504, 513, 516, 523, 528, 548, 549, 569, 572, 586, 587, 589, 127, 129, 445, 456, 520

[56] References Cited

U.S. PATENT DOCUMENTS

| 1,612,170 | 12/1926 | Bingham | 384/587 X |
| 2,983,557 | 5/1961 | Blinder | 384/513 X |
| 2,986,430 | 5/1961 | Banerian | 384/127 |
| 3,807,817 | 4/1974 | Black | 384/543 |
| 4,886,377 | 12/1989 | Adachi et al. | 384/523 X |
| 5,275,473 | 1/1994 | Hicks | 384/492 X |
| 5,332,317 | 7/1994 | Niwa et al. | 384/548 |

FOREIGN PATENT DOCUMENTS 2136887  9/1984  United Kingdom ............... 384/490

*Primary Examiner*—Thomas R. Hannon
*Attorney, Agent, or Firm*—Edgar W. Averill, Jr.

[57] ABSTRACT

A shopping cart wheel bearing which has a smooth inner race and an outer bearing holding with many semi-cylindrical openings. Each of these openings support a roller bearing or a pair of ball bearings which extend inwardly from the outer bearing to contact the inner race. As the wheel turns, each roller or ball bearing turns in the semi-cylindrical opening.

8 Claims, 2 Drawing Sheets

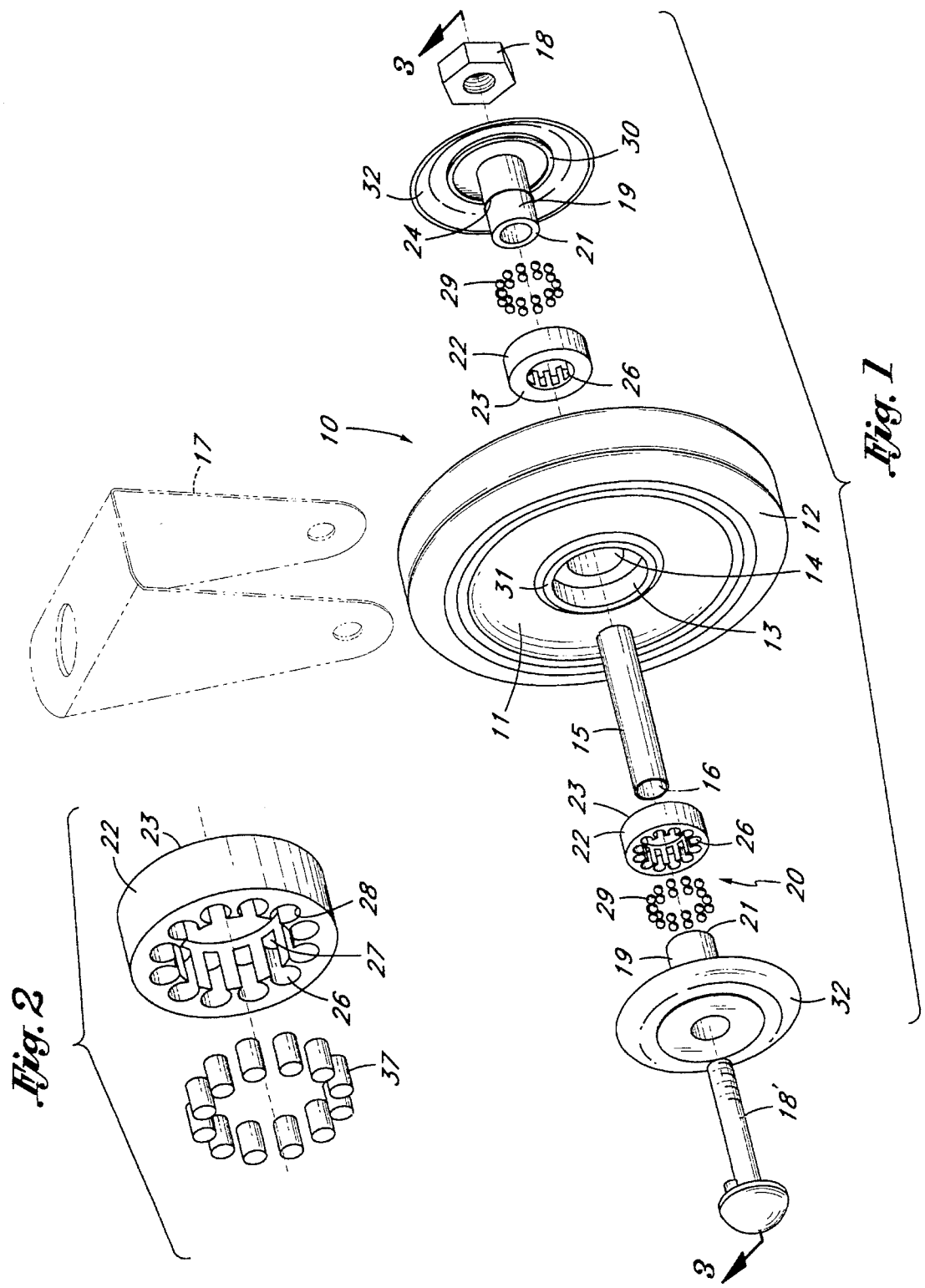

SHOPPING CART WHEEL WITH ROLLER/BALL BEARINGS

BACKGROUND OF THE INVENTION

The field of the invention is wheel bearings and the invention relates more particularly to wheel bearings of the type used in shopping cart wheels.

Shopping cart wheels are expected to carry larger and larger loads with the proliferation of large super stores. It is not uncommon for a shopping cart to be loaded with many cases of paper or canned goods which can increase the load to several hundred pounds. Shopping cart wheels of a generation ago would not be capable of withstanding such loads. Shopping cart wheels also must be able to be fabricated economically since they are used in very large quantities. Furthermore, high pressure detergent washing is often used to cleanse shopping carts and these can remove lubricants from wheel bearings and lead to noisy or poorly turning wheels.

While many wheel bearings are designed to eliminate as much friction as possible, it is actually advantageous to have a slight amount of friction in a shopping cart wheel. This is because shopping carts are often left on a slightly sloped parking lot, both while they are being unloaded and when they are empty. If the wheel bearings were set to almost completely eliminate friction, these carts would be almost impossible to keep motionless, if the surface was not absolutely horizontal. Thus, friction adding means are often provided with shopping cart wheel bearing assemblies.

SUMMARY OF THE INVENTION

It is an object of the present invention to provide a wheel bearing assembly for shopping cart wheels which is capable of a high degree of load support and which is also economical to manufacture.

The present invention is for an improved shopping cart wheel of the type having a hub which supports a tread. A bearing assembly having an outer bearing holding member supported by the hub and an inner bearing race is supported on an axle which in turn, is supported by a yoke. The improvement of the present invention includes an outer bearing holding member which is supported by the wheel hub and has at least three bearing support openings which face the central axis of the axle. One or more bearings are supported in each of the openings so that the bearings extend radially past the outer bearing holding member, and contact the inner race. As the wheel is turned, the outer bearing holding member turns, and the bearings turn within each of the bearing support openings. Preferably, the openings are semi cylindrical openings and are blind openings so that the bearings may be inserted from one end and not fall out the other end.

BRIEF DESCRIPTION OF THE DRAWINGS

FIG. 1 is an exploded perspective view of the shopping cart wheel of the present invention.

FIG. 2 is an enlarged exploded perspective view of an alternate embodiment of the right bearing assembly of the shopping cart wheel of FIG. 1.

DESCRIPTION OF THE PREFERRED EMBODIMENTS

Figure 3:
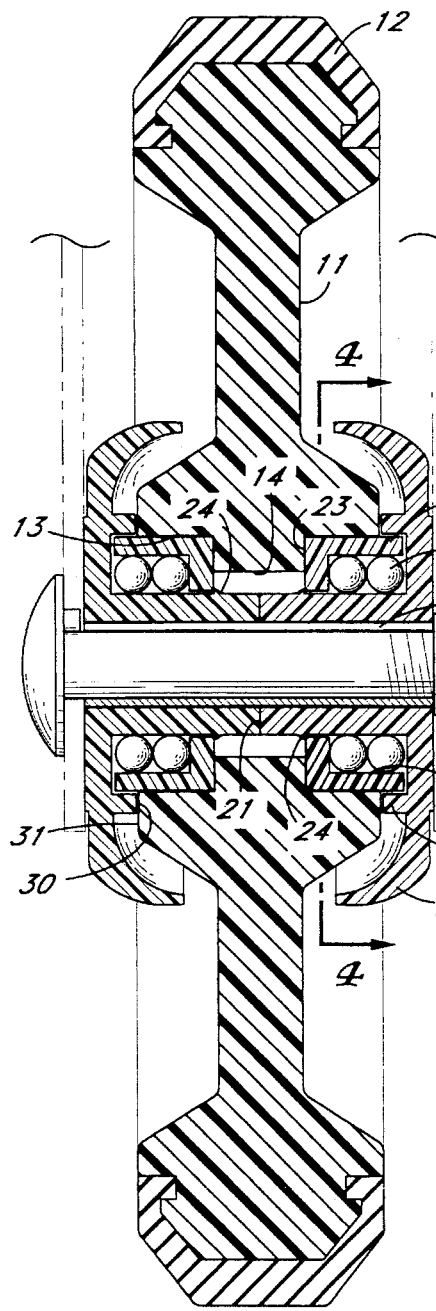
FIG. 3 is a cross sectional view of the shopping cart wheel of FIG. 1 taken along line 3—3 of FIG. 1.

The shopping cart wheel of the present invention is shown in exploded perspective view in FIG. 1 and indicated generally by reference character 10. Wheel 10 has a hub 11 which is surrounded by a tread 12 of conventional construction. Hub 11 has a pair of outer bearing support cavities 13 and a central opening 14. An axle bolt 18' has a central axis 16 which is also the central axis of the wheel and the elements of the bearing. Axle bolt 18' is held on yoke 17 by a nut 18 in a conventional manner. Yoke 17 being shown in phantom view of FIG. 1. A split sleeve 15 contacts the yoke 17 and prevents the bearing assembly from being compressed. Split sleeve 15 is preferably heat treated so that the bearing assemblies are protected against over-tightening by the split sleeve 15.

The bearing assembly indicated generally by reference character 20 has a pair of inner race members 19 which are shown as having smooth outwardly facing circular cross-sectioned bearing surfaces. A pair of outer bearing holding members 22 are supported in outer bearing support cavities 13 of hub 11. Inner surface 23 of hub 22 contacts support cavity 13.

Outer bearing holding member 22 has a plurality of semi cylindrical bearing support openings 26. Openings 26 are blind openings and are shown best in FIG. 2 and have a closed end 27 and an open end 28. A plurality of pairs of ball bearings 29 are held in each of the semi cylindrical openings 26 and essentially completely fill the openings as shown best in FIGS. 3 and 4 of the drawings. The outside diameters of each of the ball bearings indicated by "d" and the inside diameter of the semi cylindrical bearing support openings 26 is indicated by reference character "D". The ball bearing outer diameter, "d" is significantly smaller than the inside diameter, "D", of the semi cylindrical bearing support openings 26 so that the ball bearings turn freely within openings 26. This is shown best by viewing FIGS. 4 and 5. Alternatively, as shown in FIG. 2, roller bearings 37 can be substituted for each pair of ball bearings 29.

A dust ring 30 is positioned adjacent the outer face 31 and prevents dust and dirt from entering the bearing support openings 26. This is most easily seen in FIG. 3. A thread guard 32 is formed integrally with inner race member 19. The inner race members contact one another at their inner faces 21. Thus, the entire bearing assembly has only two parts in addition to the bearings and axle. A small ring 24 is formed on inner race member 19. This assists in assembly and allows the outer bearing holding member to be filled with ball or roller bearings and snapped into the inner race member and stored for later assembly steps.

Figure 4:
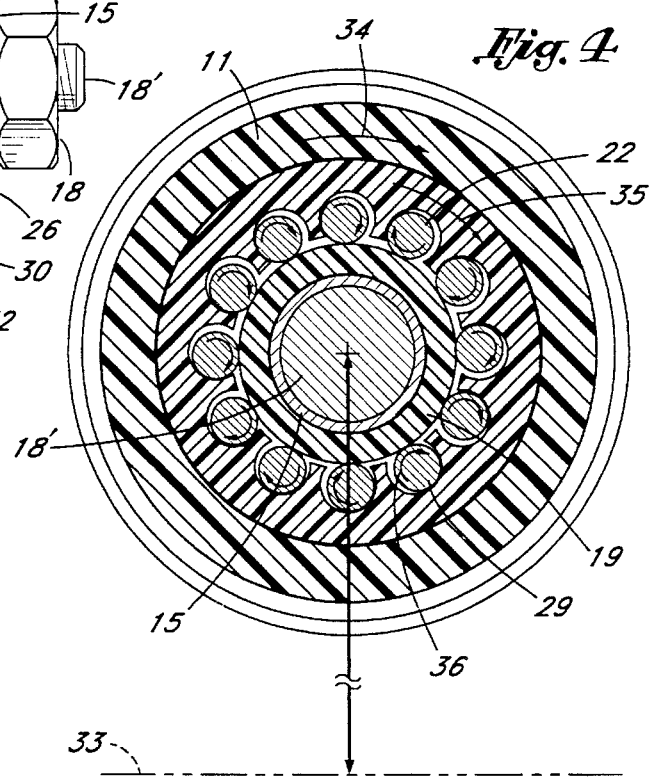
FIG. 4 is a cross sectional view taken along line 4—4 of FIG. 3.

The action of the bearings is shown best in FIG. 4 where the floor surface is indicated by reference character 33. The bearing surface of inner race 19 contacts the bearings 29 as the wheel and the wheel hub 11 turn in the direction of arrow 34. This causes the outer bearing holding member 22 to turn with hub 11 also in the direction of arrow 35. Split ring 15, axle bolt 18' and inner race member 19 are stationary. Each of the bearings 29 turn in the direction indicated by arrow 36.

Figure 5:
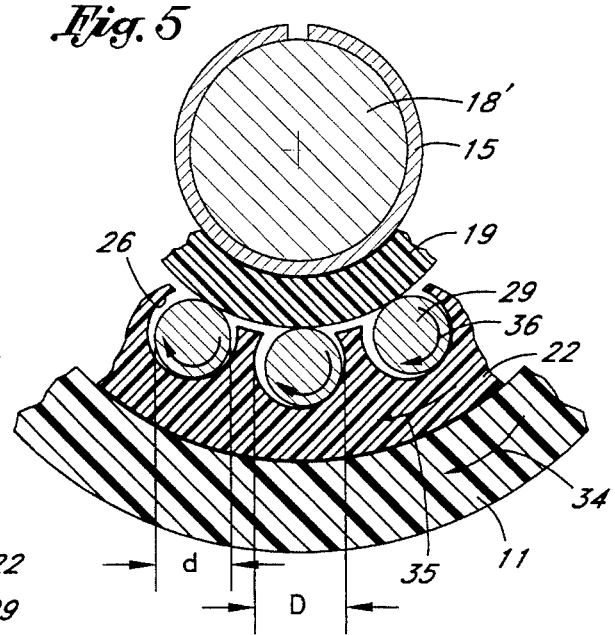
FIG. 5 is an enlarged cross sectional view of a portion of the wheel of FIG. 4.

It should be noted, as shown best in FIG. 5, that the bearings actually rub against the semi cylindrical openings 26 as the bearing turns. While this causes a small amount of friction, this is not a disadvantage for shopping cart wheels. Furthermore, the amount of friction is minimized since it is preferable to fabricate the outer bearing member from a polymer which has a relatively high degree of slip such as nylon 6—6. The bearings need not be heat treated, and may be made simply from high carbon steel.

The wheel bearing assembly of the present invention provides an ideal combination of relatively low friction, low materials cost, and low assembly cost. The wheel assembly of the present invention is capable of carrying very heavy loads without bearing destruction. Furthermore, because both the inner and outer bearing races are preferably fabricated from a high slip polymer, the bearing assembly of the present invention has a very low tendency to corrode and thus, is able to withstand the high pressure washing procedures which are more frequently being used to wash shopping carts. Also the dust ring 30 Protects the assembly against damage from pressure washing procedures. While the inner race member may be fabricated from a metal, it is preferably also fabricated from a polymer such as nylon 6—6. Grease is typically supplied with a new bearing to reduce noise but the bearing is nonetheless highly effective even though all the grease has been removed.

The number of bearings and semi cylindrical cavities should be at least 3, and preferably at least 9, with 12 being the preferred number. With 12 pairs of ball bearings (or 12 roller bearings), the weight is spread out over at least four bearings in each bearing assembly at all times.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A wheel assembly including a bearing for reducing the friction between an axle and a turning wheel, said wheel assembly having a central, fixed axle which supports a rotatable wheel through bearing means, and said wheel having a central, vertical plane and a horizontal axis, and each of said bearing means comprising:

an inner race member having a smooth, outwardly-facing, circular cross-sectioned bearing surface, said inner race member being supported on said axle and said axle having a horizontal central axis and said inner race member also having a horizontal central axis which is coaxial with the central axis of said axle;

an outer bearing holding member supported by said wheel, said outer bearing holding member having an outer surface held by said wheel and at least three bearing support openings, each opening having a diameter and a center and the centers of each bearing-support opening lying on an imaginary cylinder having a central axis lying about on the central axis of said axle; and a plurality of bearings, each bearing have an outside diameter significantly less than the diameter of said bearing support opening and each bearing being positioned in each of said bearing support openings whereby as the shopping cart wheel rolls along a floor surface, the bearings nearest the bottom of the wheel contact the outer surface of the inner race member and turn within said bearing support openings.

2. The wheel assembly of claim 1 wherein each of said bearing support openings is a blind opening.

3. A shopping cart wheel and bearing assembly including a wheel of the type having a hub which supports a tread, a bearing assembly having an outer race supported by said wheel and an inner race supported by an axle supported member and the bearing assembly including bearing elements, said axle supported member being supported on an axle supported on a yoke, wherein the improvement comprises:

said inner race member having a smooth, outwardly-facing, circular cross-sectioned bearing surface, said axle having a central axis and said inner race member also having a central axis which is coaxial with the central axis of said axle;

said outer race being supported by said hub, said outer race having an outer surface held by said hub and at least three bearing support openings, each opening having a semi-cylindrical diameter and a center and the centers of each semi-cylindrical opening lying on an imaginary cylinder having a central axis lying about on the central axis of said axle and each semi-cylindrical opening facing away from the central axis of said axle and each of said semi-cylindrical openings being blind openings having a closed end and an open end and the open end faces away from the central plane of the hub; and a plurality of pairs of ball bearings, each ball bearing of each of said pairs of ball beatings having an outside diameter slightly less than the diameter of said semi-cylindrical opening and each pair of ball bearings being positioned in each of said semi-cylindrical openings whereby as the shopping cart wheel rolls along a floor surface, the ball bearings nearest the bottom of the wheel contact the outer surface of the inner race and turn within said semi-cylindrical openings.

4. The shopping cart wheel of claim 3 wherein there are at least nine semi-cylindrical openings and nine pairs of ball bearings in each bearing assembly.

5. The shopping cart wheel of claim 4 wherein there are twelve semi-cylindrical openings and twelve pairs of ball bearings in each bearing assembly.

6. The shopping cart wheel of claim 3 wherein said inner race is formed from a polymer.

7. The shopping cart wheel of claim 3 wherein said outer race is fabricated from a polymer.

8. The shopping cart wheel of claim 7 wherein said polymer is Nylon 6–6.

* * * * *